United States Patent [19]
Kersten et al.

[11] Patent Number: 5,410,129
[45] Date of Patent: Apr. 25, 1995

[54] ARRANGEMENT FOR CONTROLLING THE HEATING POWER FOR A COOKING VESSEL

[75] Inventors: Reinhard Kersten; Klaus Klinkenberg, both of Aachen, Germany; Martin Sonnek, St. Veith, Austria

[73] Assignee: U.S. Philips Corporation, New York, N.Y.

[21] Appl. No.: 969,919

[22] Filed: Nov. 2, 1992

[30] Foreign Application Priority Data

Nov. 2, 1991 [DE] Germany .......... 41 36 133.4

[51] Int. Cl.⁶ .......................................... H05B 1/02
[52] U.S. Cl. ................................ 219/497; 219/707; 219/506; 219/501; 99/325
[58] Field of Search .............. 219/10.55 E, 10.55 B, 219/497, 506, 486, 499, 501, 400, 441, 442, 705, 707; 99/325, 280; 324/61 R; 73/61 R

[56] References Cited

U.S. PATENT DOCUMENTS

| | | | |
|---|---|---|---|
| 4,336,433 | 6/1982 | Yokozeki | 219/707 |
| 4,376,131 | 3/1983 | Mori et al. | 426/231 |
| 4,667,584 | 5/1987 | Koyama et al. | 219/10.55 B |
| 4,814,570 | 3/1989 | Takazaki | 219/707 |
| 4,849,687 | 7/1989 | Sims et al. | 219/10.55 B |
| 4,864,088 | 5/1989 | Heijima et al. | 219/492 |
| 5,015,812 | 5/1991 | Kasai et al. | 219/10.55 B |
| 5,048,400 | 9/1991 | Ueda et al. | 99/332 |

FOREIGN PATENT DOCUMENTS 3928620  3/1991  Germany .
59107138 11/1983 Japan .

*Primary Examiner*—Mark H. Paschall
*Attorney, Agent, or Firm*—Ernestine C. Bartlett

[57] ABSTRACT

In accordance with the invention an arrangement for controlling the heating power for a vessel (10) which can be heated by a cook-top (11), for example a light cook-top, by means of a sensor-controlled electronic device (19) can perform more functions in that at least one (cooking-substance) sensor (18) is associated with the vessel (10) to detect the temperature of the foodstuffs (17, 15), the vessel (10) only communicates with the ambient air via a measurement tube (13) in which a (steam) sensor (20) and, optionally, a steam sensor (21) are arranged to detect the steam point of a liquid (14) present in the vessel, and all the sensors (18, 20, 21) are connected to the electronic device (19) and can be combined with one another via the electronic device.

29 Claims, 1 Drawing Sheet

ARRANGEMENT FOR CONTROLLING THE HEATING POWER FOR A COOKING VESSEL

FIELD OF THE INVENTION

The invention relates to an arrangement for controlling the heating power for a vessel which can be heated by a cook-top, for example a light cook-top, by means of a sensor-controlled electronic device.

BACKGROUND OF THE INVENTION

The Applicant's prior German Patent Application P 41 22 430.2 which corresponds substantially to U.S. Ser. No. 896,949 filed Jun. 11, 1992, describes a device comprising a measurement tube serving as a measurement path, which tube connects the interior of the water-containing vessel to the ambient air. The measurement tube has an associated sensor (steam sensor) connected to a control device for influencing the heating power. An automatically controlled supply of heating power ensures that the amount of water evaporating at atmospheric pressure is exactly such that any residual air is expelled from the vessel. Between the hot steam leaving the vessel and the cold air entering from the outside an interface is formed, which is detected by the sensor and whose location is maintained constant by controlling the heating power within the measurement area. The formation of this interface is a sign that the so-called steam point is reached, when any residual air is expelled from the vessel. This steam point is exactly maintained by the control system. Thus, said sensor enables exact control with a minimal power supply and minimal liquid losses.

Moreover, cooking devices are known which control the power supply via a cooking-substance sensor, the sensor detecting the temperature of the cooking substance directly or indirectly and controlling the power supply via suitable electronic devices depending upon a selected function. The sensor may be introduced directly into the cooking substance, for example immersed in a liquid or constructed as a spit. Indirect measurement of the temperature of the substance being cooked is effected, for example, by detecting the temperature at the bottom of the cooking vessel or by incorporating the sensor in the cooking vessel.

With both systems the sensors are optimized for only one purpose. For example, the first-mentioned system enables foodstuffs to be cooked in water or in steam with minimal costs but roasting is not possible. Conversely, the second system, where the temperature of the food to be heated is detected directly or indirectly, allows roasting but the boiling point of a liquid cannot be detected exactly, so that such systems always operate with some "advance power", leading to increased loss of liquid and energy.

DE-OS 39 28 620 describes a cooker in which the power supply of at least one cooking element is controlled by a microprocessor. This enables the progress of the cooking process to be derived from the actual condition of the substance being cooked. One embodiment of the prior-art device combines a sensor which detects the temperature of the bottom of the vessel with an external detector which measures the temperature of the cooking substance. This combination makes it possible to realize a cooking program without burning or boiling-over of the substance to be heated.

Moreover, DE-OS 32 05 123 describes a device for cooking foodstuffs in the heating space of a microwave apparatus comprising a sensor arranged in the flow path of the air leaving the heating space. In order to enable food in the heating space of the microwave apparatus to be cooked or warmed up fully automatically a further sensor is arranged in the air inlet path to the heating space. To determine the temperature inside the food there is provided a detection device. Finally, for automatically controlling the cooking process or cooking cycle there is provided a programmable microcomputer which receives the data detected by means of the sensors and the detection device and which is loaded with various basic programs to control cooking processes for different categories of food.

SUMMARY OF THE INVENTION

An object of the invention is to make an arrangement of the type defined in the opening paragraph more versatile.

According to the invention this object is achieved in that a) at least one (cooking-substance) sensor is associated with the vessel to detect the temperature of the foodstuffs, b) the vessel only communicates with the ambient air via a measurement tube in which a (steam) sensor is arranged to detect the steam point of a liquid present in the vessel, and c) all the sensors are connected to the electronic device and can be combined with one another via the electronic device.

This enables a multifunctional use of the arrangement of the type defined in the opening paragraph to be achieved, based on automated or partly automated heat processing. This multifunctional use of the arrangement is achieved by the combination of the two sensors, i.e. the cooking-substance sensor and the steam sensor. It is then possible that, for example, only the steam sensor is operative if the food should, for example, only be boiled in water or cooked in steam. Conversely, it is also possible that only the cooking-substance sensor is operative if, for example, the food should only be roasted, in which case the sensor may be constructed, for example, as a spit. Finally, the two sensors can also operate in combination if, for example, juicy meat is to be prepared. Initially, this meat should be roasted crisply, the steam sensor being operative until the water present in the vessel has evaporated. Subsequently, the cooking-substance sensor, which is for example constructed as a spit for the meat to be roasted, becomes operative, the heating power being reduced to, for example, approximately 40% of its initial value. This heating power is then maintained until the temperature inside the meat has reached the desired level. After this, the heating is turned off because the meat is ready.

The cooking-substance sensor detects the temperature of the foodstuffs in the vessel and is there/ore very suitable for roasting or cooking by means of preselected 1/t profiles, preferably for controlling the cooking-substance temperature below 100° C., for example cooking at 80° C. and keeping warm at 50° C. The cooking-substance sensor is also operative at temperatures above 100° C., for example for deep-frying in oil of 190° C. Moreover, by means of this sensor it is possible to detect whether a minimum amount of the substance to be cooked or of water in the case of steam-cooking is present.

In the case of boiling point control (non-pressurized "steaming") the steam sensor in the measurement tube detects precisely the desired discharge of steam and reduces the applied energy very rapidly until no more steam is produced but in such a way that the boiling point is precisely maintained, as is explained in the Applicant's above-mentioned earlier U.S. application Ser. No. 896,949. The vessel, which communicates with the ambient air only via the measurement tube, is then heated until the air is expelled from the vessel and at least an adjoining part of the measurement tube. The steam-air interface then formed in the measurement tube is now detected by the steam sensor, which is constructed as a temperature sensor, and its location is maintained constant within a measurement area of the sensor by a heating power control process initiated by the sensor. Thus, this sensor enables the exact control of the steam point with a minimal energy supply and minimal liquid losses, and is therefore very suitable for the non-pressurised cooking of vegetables and meat in a strainer and for boiling water, tea, soup etc. with optimum results. The steam sensor thus controls the power supply for the cooking process in such a way that the power consumption and cooking odors are minimized by minimizing the steam-discharge rate including venting.

In an embodiment of the invention temperature elements, semiconductor elements, thermistors, moisture sensors or the like are used as sensors, which sensors control the electronic device with their temperature signals in the form of electric currents. In a further embodiment of the invention a microprocessor is associated with the electronic device and the heat-treatment process of the foodstuffs can be programmed freely via an entry means in accordance with a preselected temperature and/or time program (l/t profile). Depending on the selected l/t profile this enables the power supply to be optimized for the selected cooking process.

The cooking-substance sensor, which detects the temperature of the food, can be introduced for example directly into the food. This is obvious for example in the case of liquid foodstuffs, when the sensor is immersed, or in the case of meat, when the sensor is constructed as a roasting spit. In addition to this direct temperature measurement an indirect temperature measurement is possible in a further embodiment of the invention, the cooking-substance sensor being arranged on the cooking vessel itself or in the direct proximity thereof. This has the advantage that the sensor need not be in direct contact with the food, a disadvantage being that the measurement is less accurate.

In a further embodiment of the invention the cooking-substance sensor is of a different construction depending on the nature of the foodstuffs and is arranged to be exchangeable. This enables a rapid and simple change of the food to be processed and the associated sensor.

In a further embodiment of the invention the steam point in the measurement tube is defined by an interface between the hot steam expelled from the vessel and the cold air penetrating the measurement tube, the steam point being reached when all the air has been expelled from the vessel and no more steam emerges from the measurement tube. This measurement tube may be constructed, for example, as a handle and may be secured to the lid of the vessel. When the steam sensor is not operative the measurement tube serves to discharge vapours which emerge from the vessel, for example, during roasting.

In an embodiment of the invention after the energy supply has been switched on and after the appropriate processing temperature for the introduced foodstuffs has been reached the cooking-substance sensor supplies a signal to the electronic device to set the appropriate processing time for the introduced foodstuffs.

For the boiling and cooking process, in another embodiment of the invention, after the energy supply has been switched on and after the steam point has been reached the steam sensor supplies a signal to the electronic device to set the appropriate processing time for boiling or non-pressurized cooking of the introduced foodstuffs.

In a further embodiment of the invention, viewed in a direction towards the distal end of the measurement tube, a further steam sensor is arranged behind the steam sensor arranged in the measurement tube near the interior of the vessel in conjunction with the first steam sensor this additional steam sensor enables minor disturbances, such as briefly opening the lid without subsequent loading, to be detected on the basis of characteristic temperature curves. In this way the automated cooking process can be further optimized.

BRIEF DESCRIPTION OF THE DRAWINGS

FIG. 1 is a circuit diagram of the arrangement for the heat-processing of foodstuffs, FIG. 2 is a temperature-versus-time diagram illustrating the temperature variation during heat-processing of two kinds of foodstuffs, and FIG. 3 shows the associated power-versus-time diagram.

DETAILED DESCRIPTION OF THE PREFERRED EMBODIMENTS

Figure 1:
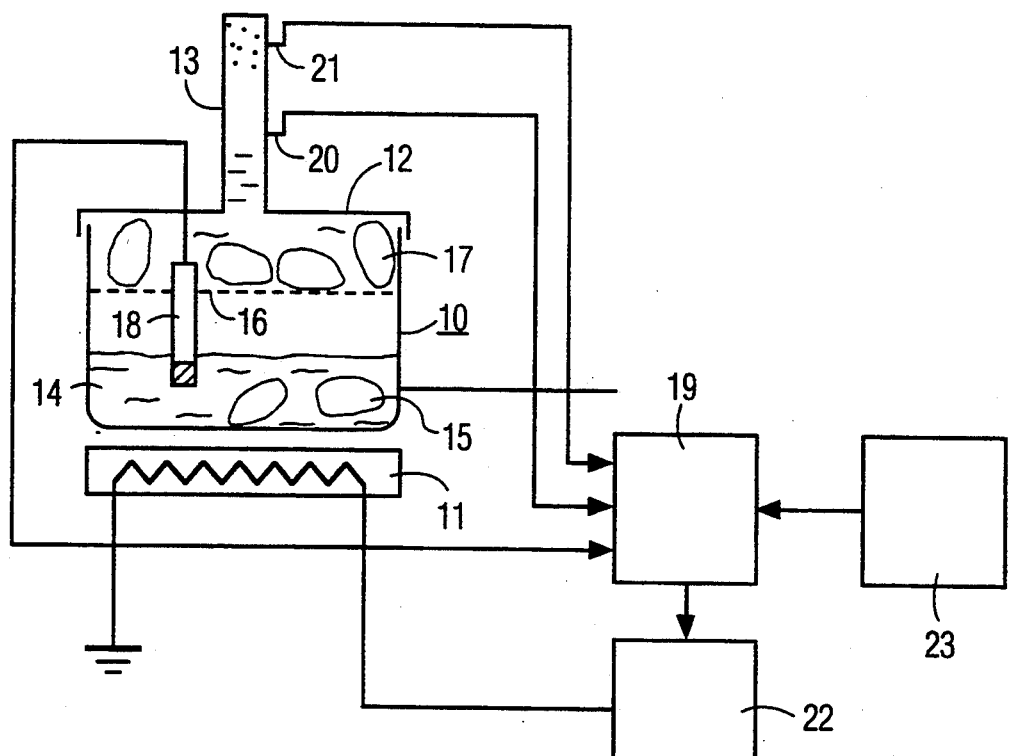
FIGS. 1 to 3 of the drawing show diagrammatically an embodiment of the invention.

The arrangement shown in FIG. 1 comprises a cooking vessel 10 which can be supplied with energy via a heating device 11 and which is closed by a lid 12. The lid 12 comprises a measurement tube 13 via which the interior of the vessel 10 communicates with the surrounding air. The vessel 10 contains water 14 in which foodstuffs 15 are to be cooked. Above the water level a strainer 16 is arranged on which further foodstuffs 17 should be cooked in steam. The temperature of the water 14 and of the food 15 is measured by means of a first sensor 18 (cooking-substance sensor), which is connected to an electronic device 19 comprising a microprocessor. In the measurement tube 13 a second sensor 20 (steam sensor) is arranged near the interior of the vessel 10 and a further steam sensor 21 is arranged near the distal end, both sensors also being connected to the electronic device 19. A power-control unit 22 serves for controlling the heating power applied to the vessel 10 via the heating device 11. With the aid of a program selection means 23 the electronic device 19 can be loaded with a preselected temperature-time profile (l/t profile).

The arrangement can be operated with the cooking-substance sensor 18 only. The steam-air mixture produced during heating will then emerge from the measurement tube 13. The amount of steam which emerges then varies depending on the control quality.

When the steam sensors 20 and 21 are operative the heating power is controlled in such a way that no steam emerges from the measurement tube 13, as explained in the above-mentioned copending Application.

Figure 2:
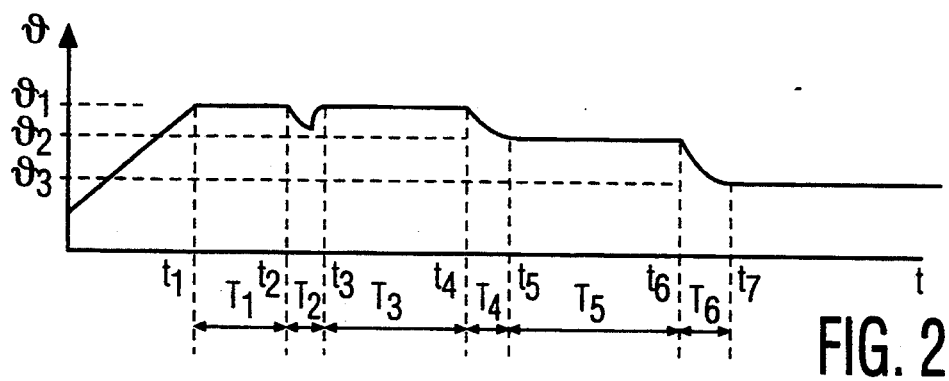
Figure 3:
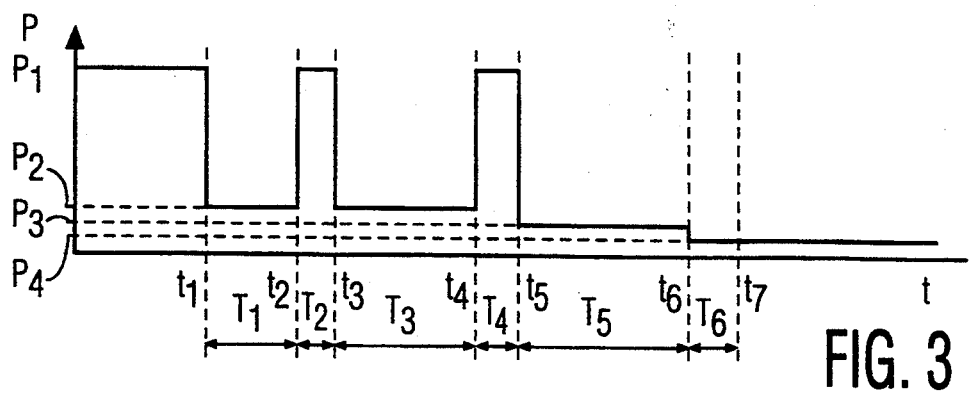

FIG. 2 by way of example shows a diagram, which illustrates a situation in which initially carrots 15 in water 14 are heated to a temperature l1 of 100° C. This situation is reached at t1. Until then the heating power is P1 (FIG. 3). At the instant t1 the steam control via the steam sensor 20 becomes active. As a result of this the heating device is influenced by controlling the steam point in the measurement tube 13 in such a way that the temperature l1 is maintained for a time interval T1. This requires a boiling power P2. After expiry of the interval T1 an acoustic signal is produced at t2, the lid 12 is opened, and potatoes 17 to be boiled are placed on the strainer 16. Now a power P1 is briefly required for the time interval T2. At t3 the control process has become stable again and at the same time the carrots 15 are cooked in water and the potatoes 17 are steamed on the strainer 16. This concurrent process continues until t4 and the temperature l1 is maintained again by controlling the steam point in the measurement tube 13 by means of the steam sensor 20. The temperature-time profile for cooking the carrots 15 during the time T1+T2+T3 and for boiling the potatoes 17 during the time T3 has been loaded in advance into the electronic device 19 via the program selection means 23.

When 14 is reached the temperature in the cooking vessel, i.e. in the water 14, is reduced to the value l2 of, for example, 80° C. This reduction is effected by means of the cooking-substance sensor 18. In the time interval T4+T5 final cooking is effected until the instant 16 is reached. After a transition time T6 the temperature is now reduced to the value l3, which is required to keep the food in the vessel 10 hot. This is also effected by means of the cooking-substance sensor 18. In FIG. 3 the corresponding power values bear the references P1 to P4.

We claim:

1. An arrangement for controlling the heating power for a vessel (10) which can be heated by a cook-top (11) by means of a sensor-controlled electronic device (19) wherein
    a) at least one cooking-substance sensor (18) is associated with the vessel (10) to detect the temperature of the foodstuffs (17, 15),
    b) the vessel (10) only communicates with the ambient air via a measurement tube (13) in which at least a first steam sensor (20) is arranged to detect the steam point of a liquid (14) present in the vessel, and
    c) the temperature sensor (18) and first steam sensor (20) are connected to the electronic device (19) and and are operable in combination and separately via the electronic device,
    said steam sensor (20) arranged in the measurement tube (13) detecting the steam point which is defined by an interface between the hot steam expelled from the vessel (10) and the cold air penetrating the measurement tube (13), the steam point being reached when substantially all the air has been expelled from the vessel (10) and substantially no steam emerges from the measurement tube (13).

2. An arrangement as claimed in claim 1, wherein said sensors control the electronic device (19) with signals in the form of electric currents.

3. An arrangement as claimed in claim 1 wherein a microprocessor is associated with the electronic device (19) and the heat-treatment process of the foodstuffs (15, 17) can be programmed freely via an entry means (23) in accordance with a preselected temperature and/or time program.

4. An arrangement as claimed in claim 1, wherein the cooking-substance sensor (18) which detects the temperature of the foodstuffs (17,15) is introduced directly into the foodstuffs.

5. An arrangement as claimed in claim 4, wherein the construction of the cooking-substance sensor (18) varies depending on the nature of the foodstuffs and said sensor (18) is arranged to be exchangeable with said other sensors of varied construction.

6. An arrangement as claimed in claim 1, which comprises means for switching on the energy supply, and means for achieving the appropriate processing temperature for the introduced foodstuffs, wherein the cooking substance sensor (18) supplies a signal to the electronic device (19) to set the appropriate processing time for the introduced foodstuffs after said means switches on the energy supply and after said means achieves the appropriate processing temperature.

7. An arrangement as claimed in claim 1, which comprises means for switching on the energy supply, and means for achieving the steam point, wherein the steam sensor (20) supplies a signal to the electronic device (19) to set the appropriate processing time (T1-T3) for boiling or non-pressurized cooking of the introduced foodstuffs after said means switches on the energy supply and after said means achieves the steam point.

8. An arrangement as claimed in claim 1, wherein viewed in a direction towards the distal end of the measurement tube (13) a second steam sensor (21) is present in the measurement tube (13) and is arranged behind the first steam sensor (20) which is arranged in the measurement tube (13) near the interior of the vessel (10).

9. An arrangement as claimed in claim 2 wherein a microprocessor is associated with the electronic device (19) and the heat-treatment process of the foodstuffs (15, 17) can be programmed freely via an entry means (23) in accordance with a preselected temperature and/or time program (l/t profile).

10. An arrangement as claimed in claim 2, wherein the cooking-substance sensor (18) which detects the temperature of the foodstuffs (17, 15) is introduced directly into the foodstuffs.

11. An arrangement as claimed in claim 3, wherein the cooking-substance sensor (18) which detects the temperature of the foodstuffs (17, 15) is arranged on the vessel (10) itself.

12. An arrangement as claimed in claim 2, which comprises means for switching on the energy supply, and means for achieving the appropriate processing temperature for the introduced foodstuffs, wherein the cooking -substance sensor (18) supplies a signal to the electronic device (19) to set the appropriate processing time for the introduced foodstuffs after said means switches on the energy supply and after said means achieves the appropriate processing temperature.

13. An arrangement as claimed in claim 3, which comprises means for switching on the energy supply, and means for achieving the appropriate processing temperature for the introduced foodstuffs, wherein the cooking -substance sensor (18) supplies a signal to the electronic device (19) to set the appropriate processing time for the introduced foodstuffs after said means switches on the energy supply and after said means achieves the appropriate processing temperature.

14. An arrangement as claimed in claim 4, which comprises means for switching on the energy supply, and means for achieving the appropriate processing temperature for the introduced foodstuffs, wherein the cooking-substance sensor (18) supplies a signal to the electronic device (19) to set the appropriate processing time for the introduced foodstuffs after said means switches on the energy supply and after said means achieves the appropriate processing temperature.

15. An arrangement as claimed in claim 5, which comprises means for switching on the energy supply, and means for achieving the appropriate processing temperature for the introduced foodstuffs, wherein the cooking-substance sensor (18) supplies a signal to the electronic device (19) to set the appropriate processing time for the introduced foodstuffs after said means switches on the energy supply and after said means achieves the appropriate processing temperature.

16. An arrangement as claimed in claim 2, which comprises means for switching on the energy supply, and means for achieving the steam point, wherein the steam sensor (20) supplies a signal to the electronic device (19) to set the appropriate processing time (T1-T3) for boiling or non-pressurized cooking of the introduced foodstuffs after said means switches on the energy supply and after said means achieves the steam point.

17. An arrangement as claimed in claim 3, which comprises means for switching on the energy supply, and means for achieving the appropriate processing temperature for the introduced foodstuffs, wherein the cooking-substance sensor (18) supplies a signal to the electronic device (19) to set the appropriate processing time for the introduced foodstuffs after said means switches on the energy supply and after said means achieves the appropriate processing temperature.

18. An arrangement as claimed in claim 4, which comprises means for switching on the energy supply, and means for achieving the appropriate processing temperature for the introduced foodstuffs, wherein the cooking-substance sensor (18) supplies a signal to the electronic device (19) to set the appropriate processing time for the introduced foodstuffs after said means switches on the energy supply and after said means achieves the appropriate processing temperature.

19. An arrangement as claimed in claim 5, which comprises means for switching on the energy supply, and means for achieving the appropriate processing temperature for the introduced foodstuffs, wherein the cooking-substance sensor (18) supplies a signal to the electronic device (19) to set the appropriate processing time for the introduced foodstuffs after said means switches on the energy supply and after said means achieves the appropriate processing temperature.

20. An arrangement as claimed in claim 6, which comprises means for switching on the energy supply, and means for achieving the appropriate processing temperature for the introduced foodstuffs, wherein the cooking-substance sensor (18) supplies a signal to the electronic device (19) to set the appropriate processing time for the introduced foodstuffs after said means switches on the energy supply and after said means achieves the appropriate processing temperature.

21. An arrangement as claimed in claim 2, wherein viewed in a direction towards the distal end of the measurement tube (13) a second steam sensor (21) is connected to the electronic device and arranged in the measurement tube behind the first steam sensor (20) which is arranged in the measurement tube (13) near the interior of the vessel (10).

22. An arrangement as claimed in claim 3, wherein viewed in a direction towards the distal end of the measurement tube (13) a second steam sensor (21) is connected to the electronic device and arranged in the measurement tube behind the first steam sensor (20) which is arranged in the measurement tube (13) near the interior of the vessel (10).

23. An arrangement as claimed in claim 4, wherein viewed in a direction towards the distal end of the measurement tube (13) a second steam sensor (21) is connected to the electronic device and arranged in the measurement tube behind the first steam sensor (20) which is arranged in the measurement tube (13) near the interior of the vessel (10).

24. An arrangement as claimed in claim 5, wherein viewed in a direction towards the distal end of the measurement tube (13) a second steam sensor (21) is connected to the electronic device and arranged in the measurement tube behind the first steam sensor (20) which is arranged in the measurement tube (13) near the interior of the vessel (10).

25. An arrangement as claimed in claim 6, wherein viewed in a direction towards the distal end of the measurement tube (13) a second steam sensor (21) is connected to the electronic device and arranged in the measurement tube behind the first steam sensor (20) which is arranged in the measurement tube (13) near the interior of the vessel (10).

26. An arrangement as claimed in claim 7, wherein viewed in a direction towards the distal end of the measurement tube (13) a second steam sensor (21) is connected to the electronic device and arranged in the measurement tube behind the first steam sensor (20) which is arranged in the measurement tube (13) near the interior of the vessel (10).

27. An arrangement for controlling the heating power for a vessel (10) which can be heated by a cooktop (11) by means of a sensor-controlled electronic device (19) wherein
   a) at least one cooking-substance sensor (18) is associated with the vessel (10) to detect the temperature of the foodstuffs (17, 15),
   b) the vessel (10) only communicates with the ambient air via a measurement tube (13) in which a first steam sensor (20) and a second steam sensor are arranged to detect the steam point of a liquid (14) present in the vessel, and
   c) the temperature sensor (18) and first steam sensor (20) are connected to the electronic device (19) and and are operable in combination and separately via the electronic device, said steam sensor (20) arranged in the measurement tube (13) detecting the steam point which is defined by an interface between the hot steam expelled from the vessel (10) and the cold air penetrating the measurement tube (13), the steam point being reached when substantially all the air has been expelled from the vessel (10) and substantially no steam emerges from the measurement tube.

28. An arrangement as claimed in claim 27 wherein the cooking-substance sensor (18) which detects the temperature of the foodstuffs (17,15) is arranged on the vessel (10) itself.

29. An arrangement as claimed in claim 27 wherein the cooking-substance sensor (18) which detects the temperature of the foodstuffs (17,15) is arranged in the direct proximity of the vessel (10).

* * * * *